US010337633B2

(12) United States Patent
Grenaway et al.

(10) Patent No.: US 10,337,633 B2
(45) Date of Patent: Jul. 2, 2019

(54) RELIEF VALVE WITH DIRECTABLE OUTLET

(71) Applicant: Emerson Vulcan Holding LLC, St. Louis, MO (US)

(72) Inventors: John R. Grenaway, Edwardsville, IL (US); Mark K. Hamm, Cullman, AL (US); John B. Miller, Arab, AL (US); William C. Osteen, Hartselle, AL (US)

(73) Assignee: Emerson Vulcan Holding LLC, St. Louis, MO (US)

( * ) Notice: Subject to any disclaimer, the term of this patent is extended or adjusted under 35 U.S.C. 154(b) by 402 days.

(21) Appl. No.: 14/476,017

(22) Filed: Sep. 3, 2014

(65) Prior Publication Data

US 2015/0059884 A1 Mar. 5, 2015

Related U.S. Application Data

(60) Provisional application No. 61/873,199, filed on Sep. 3, 2013.

(51) Int. Cl.
*F16K 17/04* (2006.01)
*F16K 17/06* (2006.01)
*F16K 27/02* (2006.01)

(52) U.S. Cl.
CPC ...... *F16K 27/0281* (2013.01); *F16K 17/0486* (2013.01); *F16K 17/06* (2013.01); *Y10T 137/7925* (2015.04)

(58) Field of Classification Search
CPC .. F16K 27/0281; F16K 17/0486; F16K 17/06; Y10T 137/7929; Y10T 137/7925; Y10T 137/5109; Y10T 137/5196; Y10T 137/524

USPC .................................................. 251/289, 290
See application file for complete search history.

(56) References Cited

U.S. PATENT DOCUMENTS

| | | | |
|---|---|---|---|
| 2,280,937 A | 4/1942 | Thornhill et al. | |
| 2,854,021 A | 9/1958 | Baldwin, Jr. et al. | |
| 3,006,364 A | 10/1961 | Osborn | |
| 4,026,322 A * | 5/1977 | Thomas | F04B 53/1022 137/512 |
| 4,046,157 A | 9/1977 | Cazalaa et al. | |
| 4,064,906 A | 12/1977 | Berg | |
| 4,213,021 A * | 7/1980 | Alexander | F16K 37/0033 137/540 |
| 4,531,542 A * | 7/1985 | Looney | F16K 17/0406 137/514.7 |
| 4,543,987 A * | 10/1985 | Ekeleme, Jr. | F16K 17/0413 137/522 |

(Continued)

OTHER PUBLICATIONS

International Preliminary Report on Patentability for International application No. PCT/IB2014/002933; dated Mar. 8, 2016; 7 pages.

*Primary Examiner* — Marina A Tietjen
*Assistant Examiner* — Frederick D Soski
(74) *Attorney, Agent, or Firm* — Quarles & Brady LLP

(57) ABSTRACT

A relief valve including a body defining an inlet. A valve closure element is disposed at least partially within the body and arranged to allow selective flow through the relief valve in response to a predetermined pressure. An outlet housing that is separate from and coupled to the inlet housing is rotatable with respect to the inlet housing. The outlet housing defines an outlet that is in selective communication with the inlet.

19 Claims, 9 Drawing Sheets

(56) References Cited

U.S. PATENT DOCUMENTS

| | | | |
|---|---|---|---|
| 4,566,486 A | | 1/1986 | Taylor et al. |
| 4,712,576 A | | 12/1987 | Ariizumi et al. |
| 4,726,395 A | * | 2/1988 | Howes ............... F16K 1/32 137/469 |
| 4,823,835 A | * | 4/1989 | Chu ............... F16K 27/0281 137/557 |
| 5,168,895 A | | 12/1992 | Voss |
| 5,400,817 A | | 3/1995 | Voss et al. |
| 5,611,646 A | | 3/1997 | Voss |
| 5,644,930 A | | 7/1997 | Albertson et al. |
| 6,019,125 A | * | 2/2000 | Reverberi ........... F04B 53/1027 137/454.6 |
| 6,571,822 B2 | | 6/2003 | Neugebauer et al. |
| 6,612,538 B2 | | 9/2003 | Fukano et al. |
| 6,752,377 B1 | | 6/2004 | Taylor et al. |
| 2003/0029504 A1 | | 2/2003 | Neugebauer et al. |
| 2009/0020171 A1 | | 1/2009 | Benstead |

* cited by examiner

RELIEF VALVE WITH DIRECTABLE OUTLET

CROSS REFERENCE TO RELATED APPLICATIONS

This application claims priority to U.S. Provisional Patent Application No. 61/873,199, filed Sep. 3, 2013, the entire disclosure of which is hereby incorporated by reference herein.

BACKGROUND

The present invention is directed to pressure relief valves. More particularly the invention is directed to pressure relief valves with a moveable outlet. Pressure relief valves may be used with compressors, engines, or other systems where pressure needs to be managed.

Pressure relief valves are used to relieve pressure in a pressure vessel or associated component. A relief valve includes an inlet for receiving a fluid (e.g., air, water, petrol, etc.) and an outlet through which the fluid is discharged. The outlet is typically connected to a piping system. When relief valves are installed in pressure vessel systems, the outlet may not be aligned as desired with the piping system. Typically, relief valves are installed by threadably engaging the inlet with the pressure vessel system. The inlet may have threads that conform to a National Pipe Thread Taper standard for a tapered thread (hereinafter "NPT threads"), a Society of Automotive Engineers standard for a straight thread (hereinafter "SAE threads"), or another thread standard, as desired. Relief valves also may be connected via other means to the pressure vessel system (e.g., quick connections, soldering, snap connections, etc.).

In the case of a relief valve whose inlet has NPT threads, the outlet is aligned with the piping system by adjusting one or more fitting joints to orient the outlet in a desired direction. However, such adjustments require frequent loosening and retightening of the fitting joints which is labor intensive and time consuming. Additional labor and time is also needed to ensure that joint seal integrity is maintained. In the case of a relief valve whose inlet has SAE threads, the relief valve is installed by rotatably engaging the inlet into the threaded hole of the pressure vessel system until contact is made between the inlet and a bottom of the threaded hole (i.e., the inlet "bottoms out") in order to form a seal. However, adjustment of the orientation of the outlet after the inlet bottoms would compromise the seal and thus is not desirable. This requires that the piping system be specifically configured to adapt to the orientation of the outlet which increases costs. In other words, conventional relief valves prohibit or mitigate the use of SAE connections on relief valve inlets where outlet direction is important.

Currently, if a directional outlet is desirable, the convention is to use NPT threads on inlet connections of relief valves and deal with the labor associated with adjusting multiple joints or potentially over tightening or under tightening joints. In cases where SAE inlet connections are required, the plumbing installation out of the relief valve becomes more cumbersome. In response to these problems, many simply avoid applications where directing outlet discharge is required or they are forced spend a lot of time adjusting installation joints (loosening and retightening or over tightening to achieve pointing discharge of valve in desired direction).

In view of the above noted and other deficiencies, a better directional outlet for relief valves is desirable.

BRIEF SUMMARY OF THE INVENTION

The present embodiments overcome the aforementioned problems by providing a relief valve with a rotatable outlet housing sealed to a body of the relief valve.

In one construction, the invention provides a relief valve that includes a body that defines an inlet. A valve closure element is disposed at least partially within the body and arranged to allow selective flow through the relief valve in response to a predetermined pressure. An outlet housing that is separate from and coupled to the body is rotatable with respect to the body. The outlet housing defines an outlet aperture that is in selective communication with the inlet.

In another construction, the invention provides a relief valve for directionally relieving pressure from an inlet stub that provides fluid pressure substantially along an axial direction. The relief valve includes a body that defines an inlet and a body cavity. The body includes an annular body wall defining an exit hole. A valve closure element is disposed at least partially within the body. The valve closure element inhibits fluid communication between the inlet and the body cavity when the valve closure element is in a closed position. The valve closure element is biased toward the closed position by a valve closing force. An outlet housing that is separate from and coupled to the body is rotatable with respect the body. The outlet housing defines an outlet. An annular space is defined between the body and the outlet housing. The annular space and the body cavity are separated by and contact opposing surface of the annular body wall. The exit hole provides fluid communication between the body cavity and the annular space. The valve closure element moves from the closed position to an open position when the fluid pressure exceeds an opening pressure. The opening pressure is a pressure that provides an opening force on the valve closure element that is greater than the valve closure force. The annular space and the outlet directly contact one another.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

Figure 1:
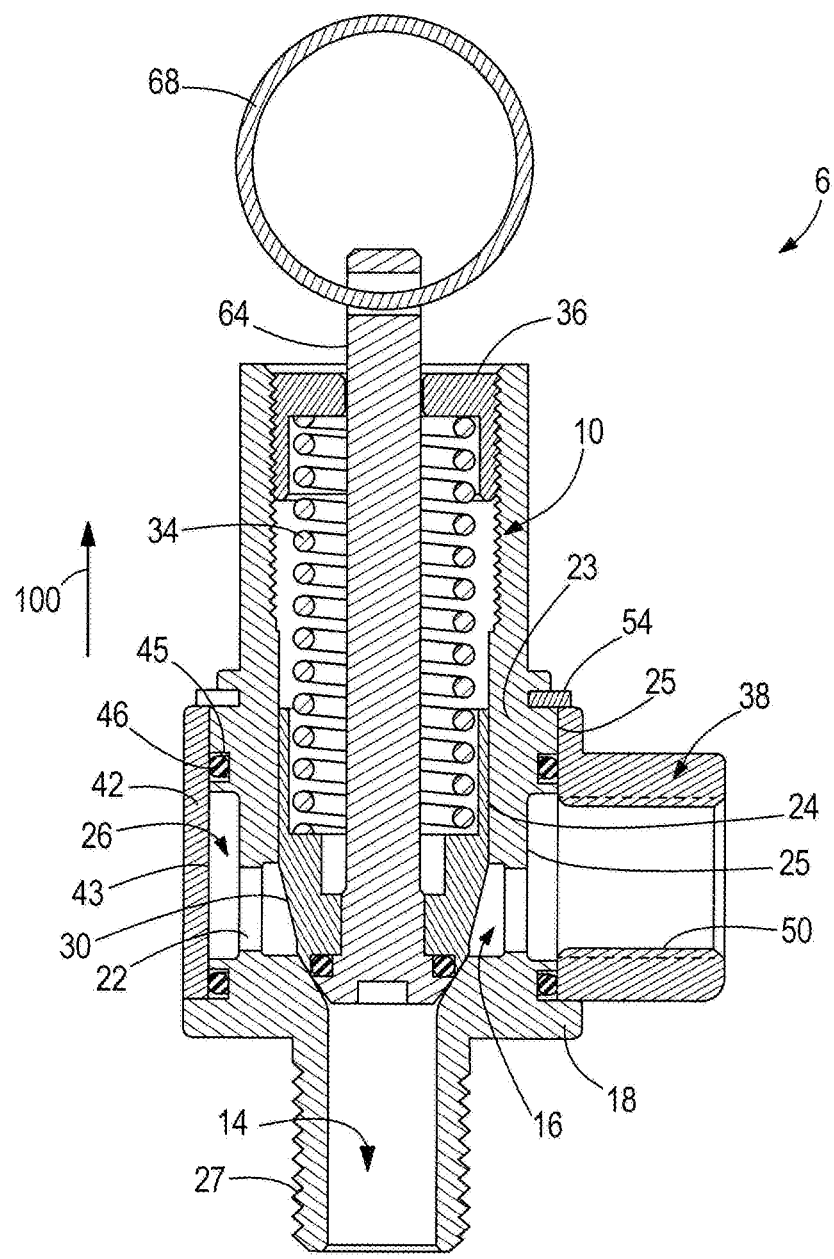
FIG. 1 is a section view of a relief valve according to one construction of the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

The present invention will be described in terms of one or more embodiments, and it should be appreciated that many equivalents, alternatives, variations, and modifications, aside from those expressly stated, are possible and within the scope of the invention.

In the disclosed invention, to achieve the desired outlet position the outlet function is separated from an inlet housing or body assembly (body) and inlet function. The inlet connection is integral to the body. The outlet is part of a separate housing that slips over a cylindrical body so that the outlet housing can rotate about the centerline of the body. The body contains all necessary components to a pressure relief valve and the valve closure element is fully functional without the outlet housing. The body has multiple discharge holes that are arranged about the circumference of its outer diameter. Therefore, the discharge by the assembly without the outlet housing is multidirectional radially about the relief valve. The relief valve absent the outlet housing is fully functional and can be used as such in applications not requiring discharge in one direction. In applications requiring discharge directionality, the outlet housing can be assembled with the rest of the relief valve (i.e., the outlet assembly). It is held in position on the body with, for example, two retaining rings (or one retaining ring and a shoulder machined into the body). The discharge holes in the body are aligned with an internal annular cavity designed into the outlet housing which allows for a smooth, uniform, and ample flow space to flow the discharge. The outlet housing has one outlet hole which is connected to the annular flow cavity in the interior of the housing. This outlet housing can pivot about the body while riding on two o-rings (alternately the smooth rotation can be achieved with two rows of ball bearings) which also provide a seal between the body and the outlet housing in two places on either side of the flow cavity. During installation, the body inlet is screwed into the piping installation snuggly. After the inlet is installed, the floating/pivoting outlet housing is rotated to its desired direction then held in position with a locking mechanism (e.g., a set screw). Alternatively, an annular space may be arranged on the outside of the body and the outlet housing simply has a hole in communication with the annular space. When the outlet housing is slipped over the body a cavity is achieved by combining both the outlet housing and the body.

FIG. 1 shows a relief valve 6 that includes an inlet housing in the form of a body 10 that defines an inlet 14, a body cavity 16, a shoulder 18, exit holes 22, an annular body wall 23, an annular space 26, and two or more o-ring channels 45.

The body 10 is monolithic. The exit holes 22 are disposed within the annular body wall 23. A valve closure element in the form of a piston 30 and spring 34 are arranged within the body 10. The piston 30 and spring 34 are arranged along an axial direction 100. The spring 34 is retained at an end opposite the piston 30 by a spring adjustment mechanism 36 (for example, an adjustable screw). In other constructions, the valve closure element may include a seat disk, a ball, a cone seal, or another closure element, as desired. Further, the valve closure element may ride in a track or guide between open and closed positions. The construction of the valve closure element is not limiting within the scope of the present invention. The relief valve 6 is shown in a closed position.

Still referring to FIG. 1, an outlet housing 38 is coupled to the body 10 and arranged to rotate three-hundred-sixty degrees (360°) thereabout. The outlet housing 38 defines an annular outlet housing wall 42 that is sealed relative to the body 10 by o-rings 46 and includes an outlet 50 (for example, an outlet aperture). In certain embodiments, the outlet 50 or outlet aperture is threaded. The annular outlet housing wall 42 has a substantially cylindrical inner annular outlet housing wall surface 43. The annular outlet housing wall 42 or inner annular outlet housing wall surface 43 can abut the annular space 26. It should be appreciated that defining the annular space 26 or the o-ring channels 45 within the body 10 and abutting the annular space 26 with the annular outlet housing wall 42 or inner annular outlet housing wall surface 43 enables machining of the annular space 26 or o-ring channels 45 from a substantially cylindrical part to form the body 10 or annular body wall 23 without the need to machine spaces or channels into the substantially cylindrical inner annular outlet housing wall surface 43. The outlet housing 38 is retained to the body 10 by a retainer clip 54.

Still referring to FIG. 1, the valve closure element can respond to a force applied by a fluid that enters the body 10 at the inlet 14 and displaces the piston 30 along the axial direction 100. The valve closure element prevents fluid communication between the inlet 14 and the body cavity 16 when the valve closure element is in the closed position. The valve closure element is biased toward the closed position by a valve closing force provided by the spring 34. The valve closure element moves from the closed position toward an open position when the fluid pressure exceeds an opening pressure. The opening pressure is a pressure that provides an opening force on the valve closure element that is greater than the valve closure force. This description of the function of the valve closure element of the relief valve 6 is applicable to other embodiments described herein.

Still referring to FIG. 1, the inlet 14 is the space that the fluid occupies when the relief valve 6 is in the closed position, so the inlet 14 is the space within the body 10 prior to the seal formed by the valve closure element. When the valve closure element is in the closed position, the fluid is in contact with the body 10 and the piston 30. When the fluid displaces the valve closure element to the open position, fluid communication is established between the inlet 14 and the body cavity 16. The body cavity 16 is the space between the inlet 14 and the exit holes 22 and is bounded by the annular body wall 23. Fluid communication is provided between the body cavity 16 and the annular space 26 by the exit holes 22. The body cavity 16 and the annular space 26 are separated by the annular body wall 23. The annular body wall 23 includes an inner annular body wall surface 24 and an outer annular body wall surface 25. The body cavity 16 and the annular space 26 contact opposing surfaces of the annular body wall 23. A flow path from the inlet 14 to the outlet 50 or outlet aperture may be such that a fluid traveling along the flow path comes into contact substantially only with the body 10, the piston 30, and the outlet housing 38. This description of the layout of spaces, walls, and surfaces within the relief valve 6 is applicable to other embodiments described herein.

The relief valve 6 may include a manual release mechanism which may be in the form of a pull rod 64 and pull ring 68. The manual release mechanism functions by application of a manual force to overcome the valve closing force of the valve closure element.

Figures 2, 3:
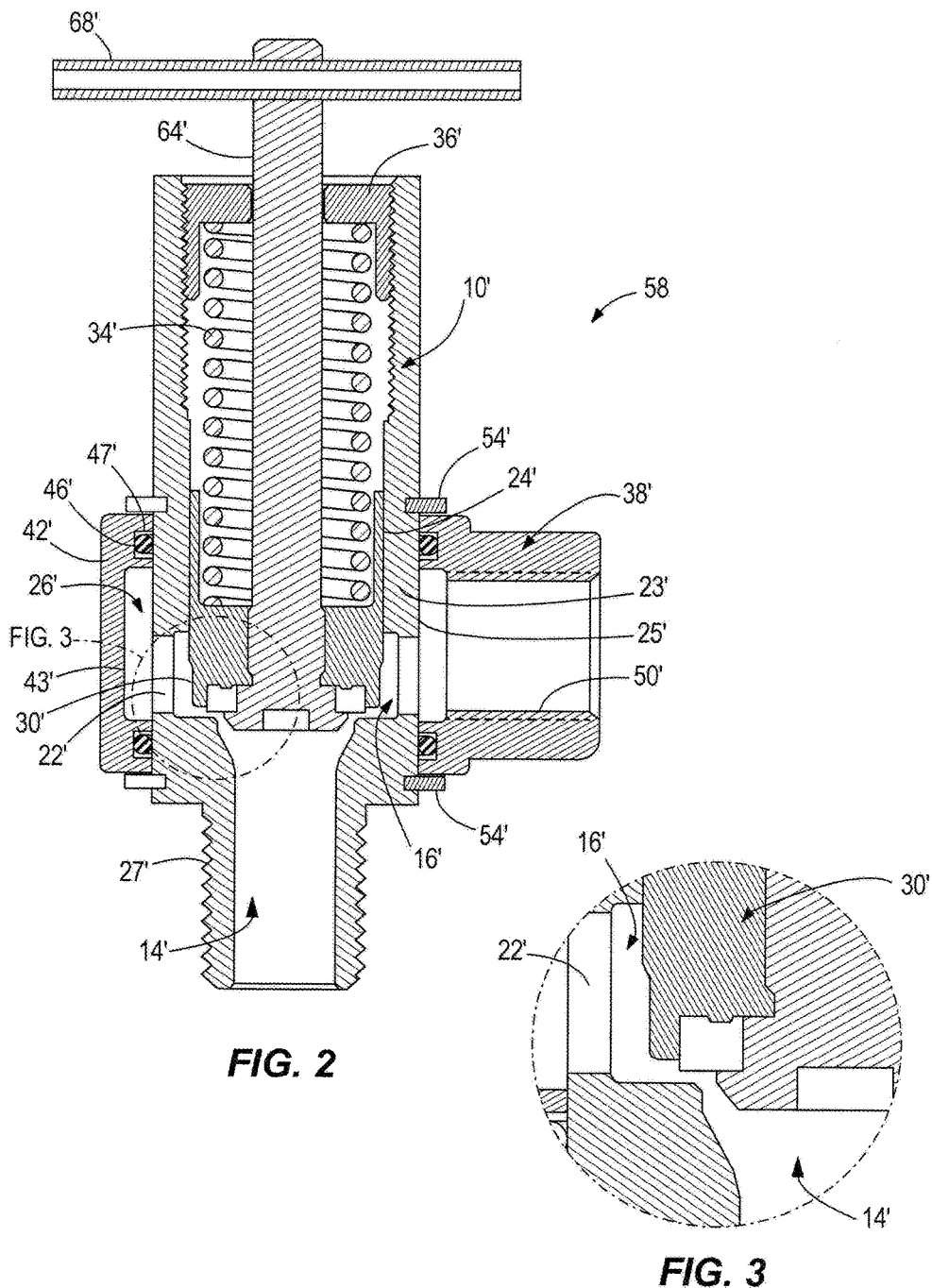
FIG. 2 is a section view of a relief valve according to another construction of the invention.
FIG. 3 is a detail view of a portion of the relief valve of FIG. 2.

FIGS. 2 and 3 show a relief valve 58 that includes a body 10' that defines an inlet 14', a body cavity 16', exit holes 22', and an annular body wall 23'. The body 10' does not define a shoulder or an annular space. The body 10' is monolithic. The exit holes 22' are disposed within the annular body wall 23'. The annular body wall 23' has an inner annular body wall surface 24' and an outer annular body wall surface 25'. The outer annular body wall surface 25 is substantially cylindrical. A valve closure element in the form of a piston 30' and spring 34' is arranged within the body 10'. The piston 30' and spring 34' are arranged along an axial direction 100. The spring 34' may be retained at an end opposite the piston 30' by a spring adjustment mechanism 36' (e.g., an adjustable screw). The relief valve 58 is shown in an open position.

An outlet housing 38' is coupled to the body 10' and arranged to rotate three-hundred-sixty degrees (360°) thereabout. The outlet housing 38' defines an annular outlet housing wall 42' that defines two or more o-ring channels 47 and an annular space 26' that is sealed relative to the body 10' by o-rings 46' disposed in the o-ring channels 47 and includes an outlet 50' (for example, an outlet aperture). In certain embodiments, the outlet 50' or outlet aperture may be threaded. The outer annular body wall surface 25' can abut the annular space 26'. It should be appreciated that defining the two or more o-ring channels 47 and the annular space 26' within the outlet housing 38' and abutting the o-ring channels 47 and the annular space 26' with the outer annular body wall surface 25' enables machining of the annular space from a substantially cylindrical part to form the outlet housing 38' without the need to machine the substantially cylindrical outer annular body wall surface 25'. The outlet housing 38' is retained to the body 10' by two retainer clips 54'.

The relief valve 58 may include a manual release mechanism which may be in the form of a pull rod and pull pin. The manual release mechanism functions by application of a manual force to overcome the sealing force of the valve closure element. The construction of the manual release mechanism is not limiting within the scope of the present invention.

The function of the relief valve 58 is the same as that described in reference to FIG. 1. A flow path from the inlet 14' to the outlet 50' or outlet aperture may be such that a fluid traveling along the flow path comes into contact substantially only with the body 10', the piston, 30', and the outlet housing 38'.

Figure 4:
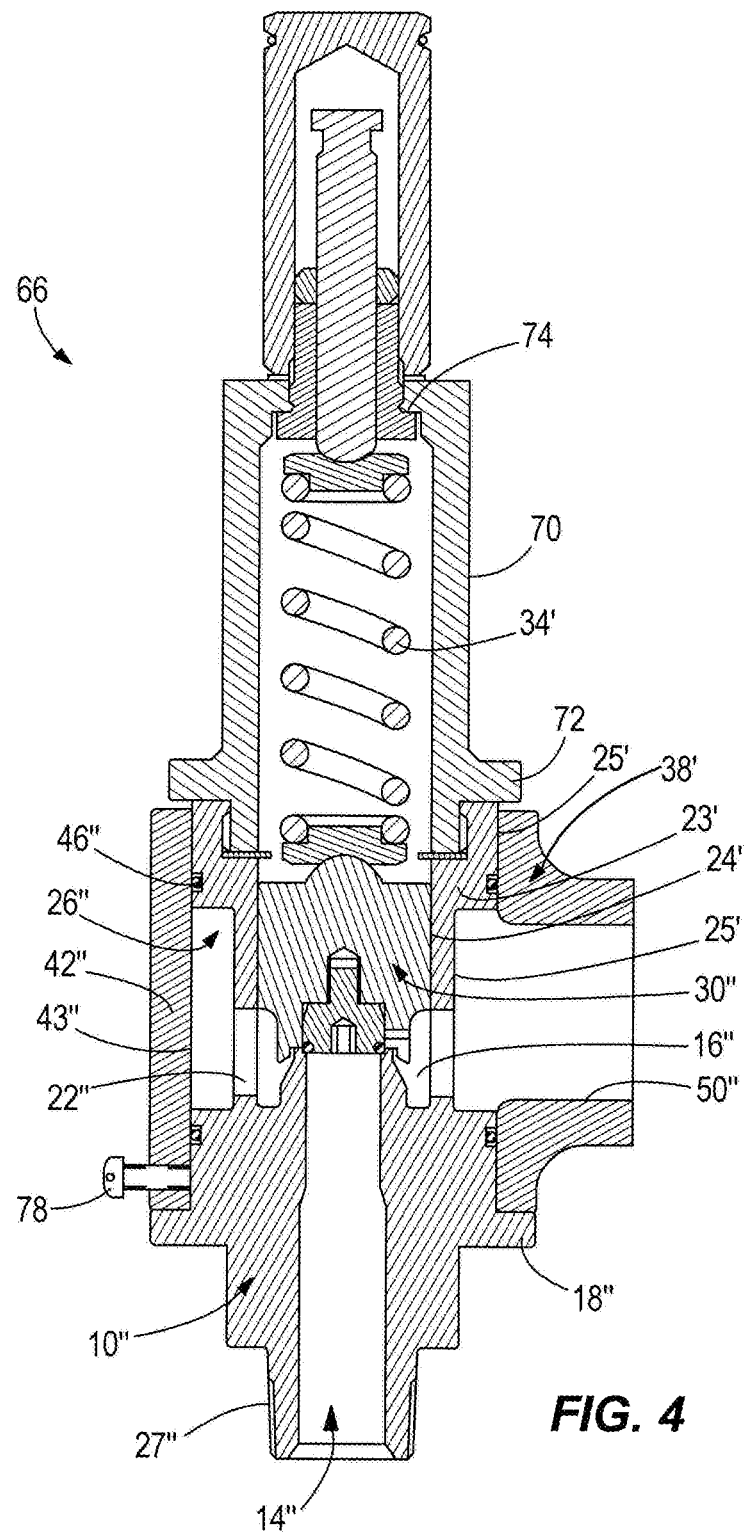
FIG. 4 is a section view of a relief valve according to another construction of the invention.
Figure 5:
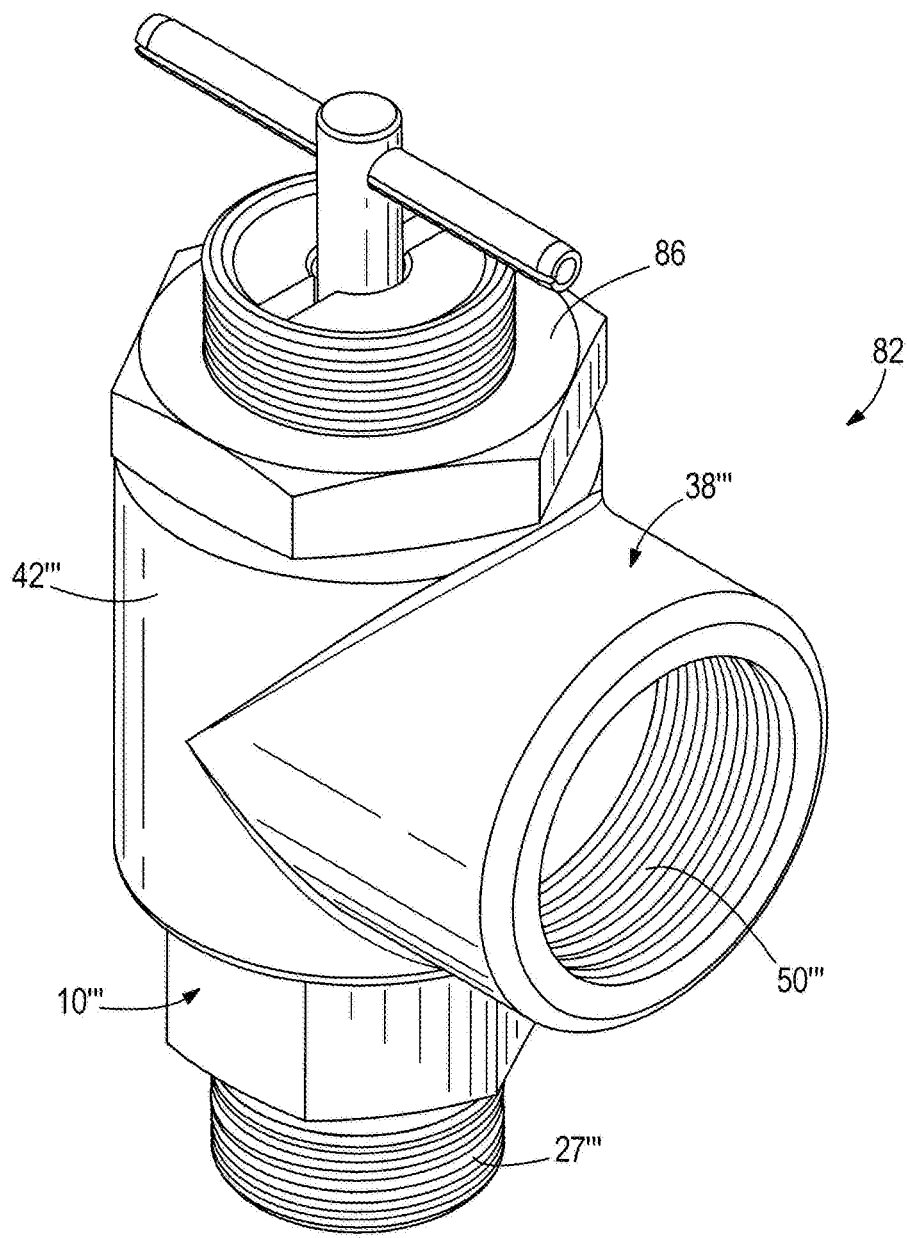
FIG. 5 is a perspective view of a relief valve according to another construction of the invention.

FIG. 4 shows a relief valve 66 that includes a body 10" that defines an inlet 14", a shoulder 18", exit holes 22", and annular body wall 23" and an annular space 26", The body 10" is monolithic. The exit holes 22" are disposed within the annular body wall 23". A threaded bonnet 70 is threadingly coupled to the body 10" and defines a bonnet shoulder 72. A valve closure element in the form of a piston 30" and a spring 34" is arranged within the body 10" and the bonnet 70 and a bonnet insert 74 is arranged to adjust the relief valve 66. The piston 30" and spring 34" are arranged along an axial direction 100. The spring 34" may be retained at an end opposite the piston 30" by a spring adjustment mechanism 36" (e.g., an adjustable bonnet insert). The relief valve 66 is shown in a closed position.

An outlet housing 38" is coupled to the body 10" and arranged to rotate three-hundred-sixty degrees (360°) thereabout. The outlet housing 38" defines an annular outlet housing wall 42" that is sealed relative to the body 10" by o-rings 46" and includes an outlet 50" (for example, an outlet aperture). In certain embodiments, the outlet 50" or outlet aperture may be threaded. The outlet housing 38" is retained to the body 10" by the shoulder 18" and the bonnet shoulder 72. A lock screw 78 is arranged through the annular outlet housing wall 42" to maintain the outlet housing 38" is a consistent position relative to the body 10", as desired.

The function of the relief valve 66 is the same as that described in reference to FIG. 1, A flow path from the inlet 14" to the outlet 50" or outlet aperture may be such that a fluid traveling along the flow path comes into contact substantially only with the body 10", the piston 30", and the outlet housing 38".

Figure 6:
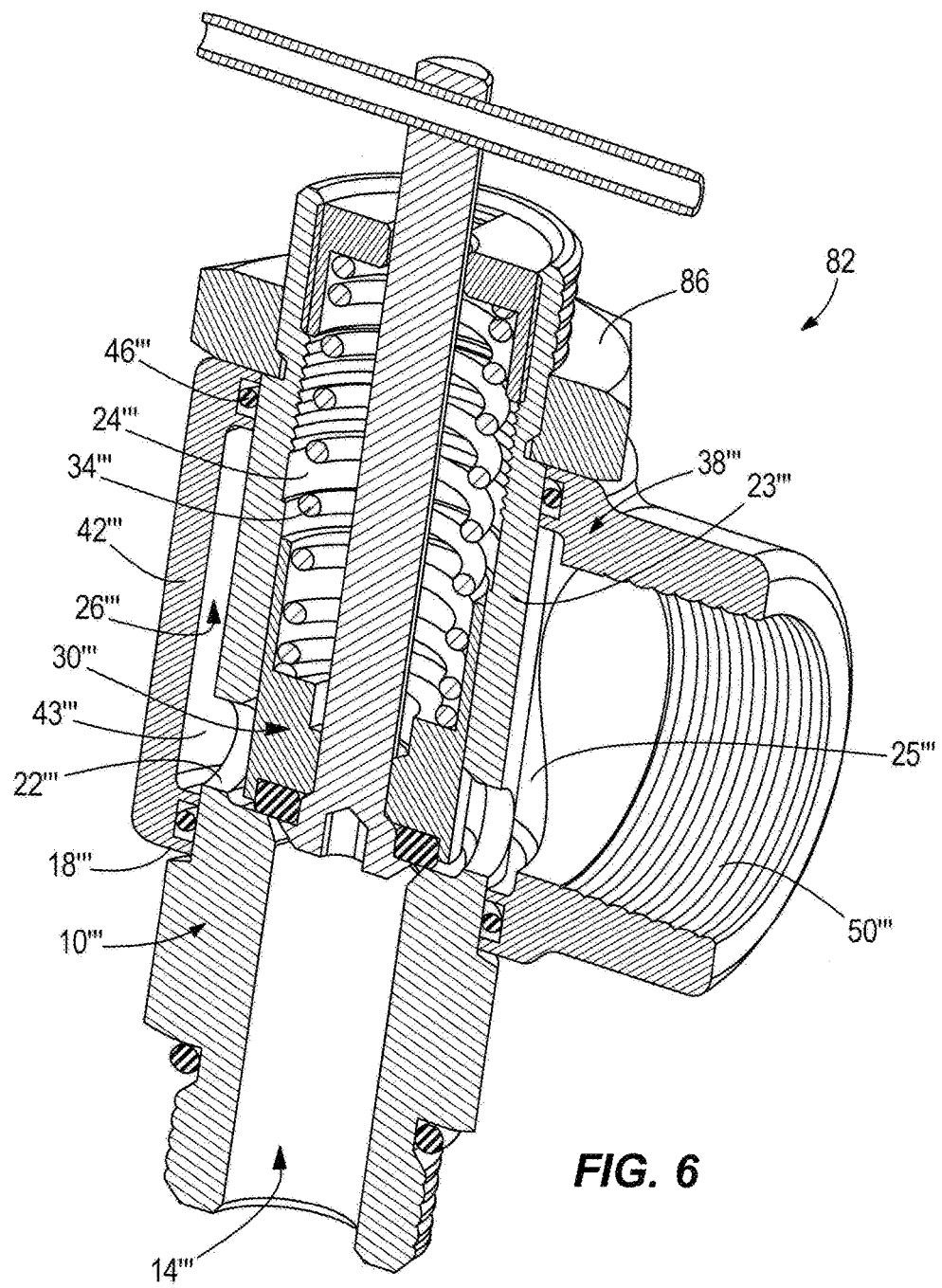
FIG. 6 is a section view of the relief valve of FIG. 5.
Figure 7:
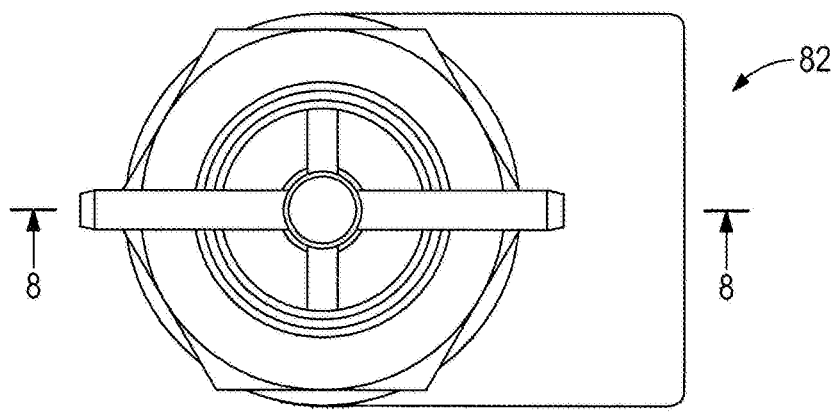
FIG. 7 is a top view of the relief valve of FIG. 5.
Figure 8:
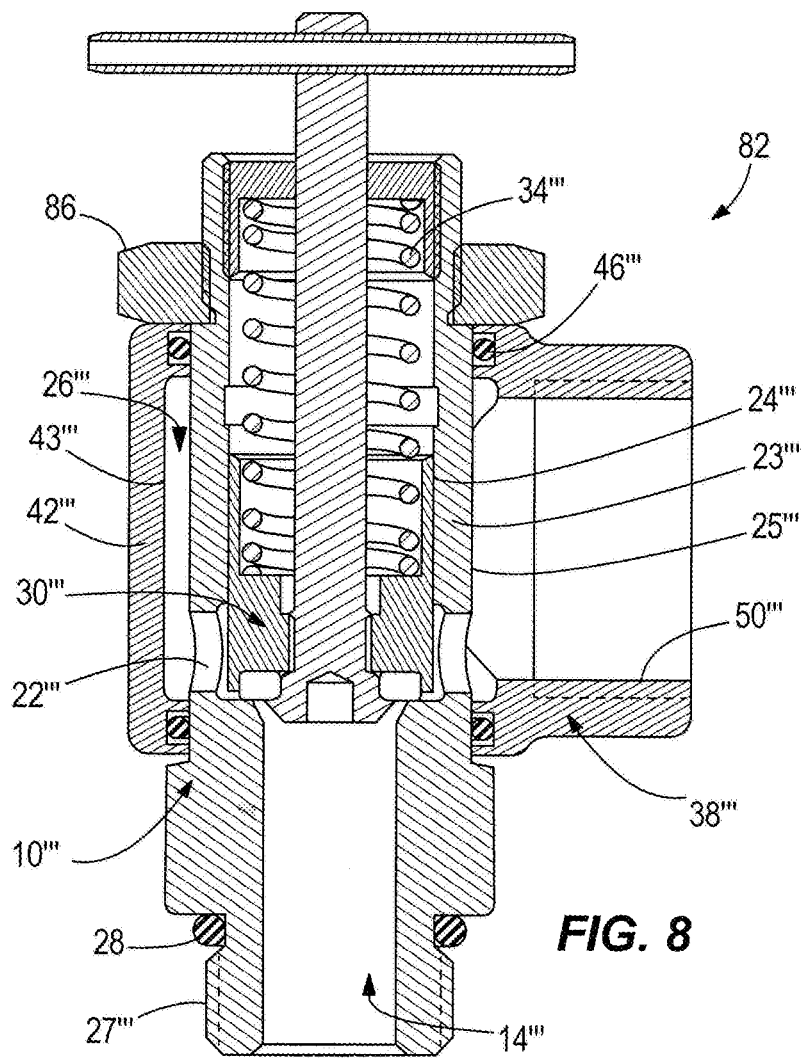
FIG. 8 is a section view of the relief valve of FIG. 5 taken along line A-A of FIG. 7.

FIGS. 5-8 show a relief valve 82 that includes a body 10''' that defines an inlet 14''', a shoulder 18''', exit holes 22''', and an annular body wall 23''''. The body 10''' is monolithic. The exit holes 22''' are disposed within the annular body wall 23''' A valve closure element in the form of a piston 30''' and a spring 34''' is arranged within the body 10'''. The piston 30''' and spring 34''' are arranged along an axial direction 100. The spring is retained at an end opposite the piston by a spring adjustment mechanism 36' (for example, an adjustable screw). An outlet housing 38''' is coupled to the body 10''' and arranged to rotate three-hundred-sixty degrees (360°) thereabout. The outlet housing 38''' defines an annular outlet housing wall 42''' that defines an annular space 62''' that is sealed relative to the body 10''' by o-rings 46''' and includes an outlet 50''' (for example, an outlet aperture). In certain embodiments, the outlet 50''' or outlet aperture may be threaded. The outlet housing 38''' is retained to the body 10''' by a threaded lock nut 86. In FIGS. 6 and 8, the relief valve 82 is shown in a closed position. FIG. 8 is a section view of the valve of FIG. 7 taken along line 8-8 of FIG. 7.

The function of the relief valve 82 is the same as that described in reference to FIG. 1. A flow path from the inlet 14''' to the outlet 50''' or outlet aperture may be such that a fluid traveling along the flow path comes into contact substantially only with the body 10''', the piston 30''', and the outlet housing 38'''.

Figure 9:
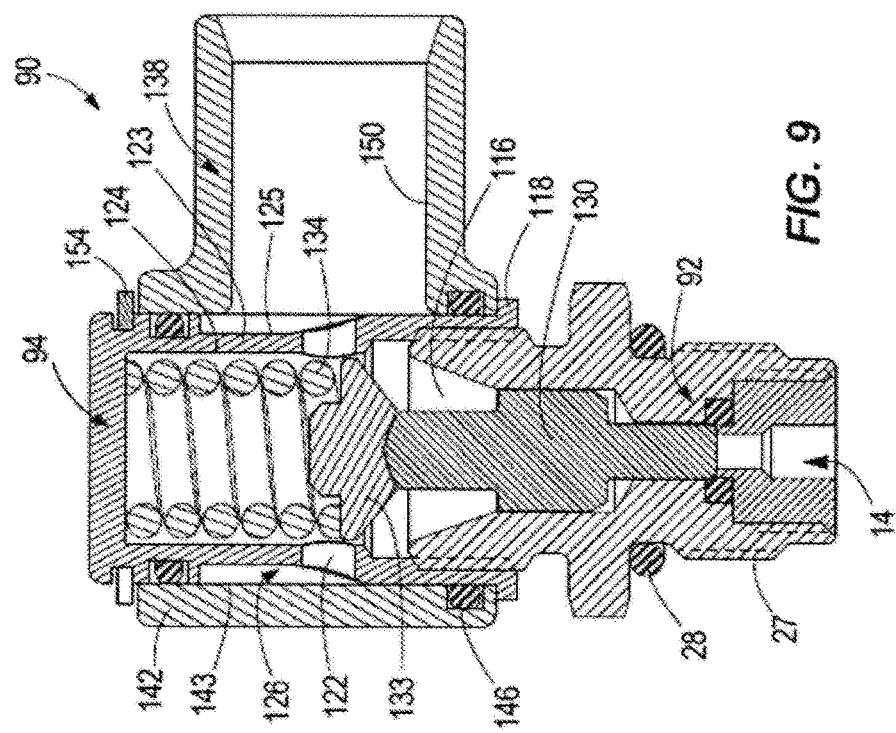
FIG. 9 is a section view of a relief valve according to another construction of the invention.

FIG. 9 shows a relief valve 90 that includes a body that is not monolithic and comprises a first body element 92 and a second body element 94. The first body element 92 defines an inlet 114. The second body element 94 is threadingly coupled to the first body element 92 and defines a shoulder 118, exit holes 122, an annular body wall 123, and an annular space 126. The exit holes 122 are disposed within the annular body wall 123. A valve closure element in the form of a piston 130, a stabilizing element 133, and a spring 134 is arranged within the first body element 92 and the second body element 94. The piston 130, stabilizing element 133, and spring 134 are arranged along an axial direction 100. The relief valve 90 is shown in a closed position. An outlet housing 138 is coupled to the body 110 and arranged to rotate three-hundred-sixty degrees (360°) thereabout. The outlet housing 138 defines an annular outlet housing wall 142 that is sealed relative to the body 110 by o-rings 146 and includes an outlet 150' (for example, an outlet aperture). In certain embodiments, the outlet 150 or outlet aperture may be threaded. The outlet housing 138 is retained to the body 110 by the shoulder 118 and a retainer clip 154.

The function of the relief valve 90 is the same as that described in reference to FIG. 1. A flow path from the inlet 114 to the outlet 150 or outlet aperture may be such that a fluid traveling along the flow path comes into contact substantially only with the first body element 92, the second body element 94, the piston, 130, and the outlet housing 138. In certain embodiments, a fluid traveling along the flow path comes into contact with the stabilizing element 133 and the spring 134.

Figure 10:
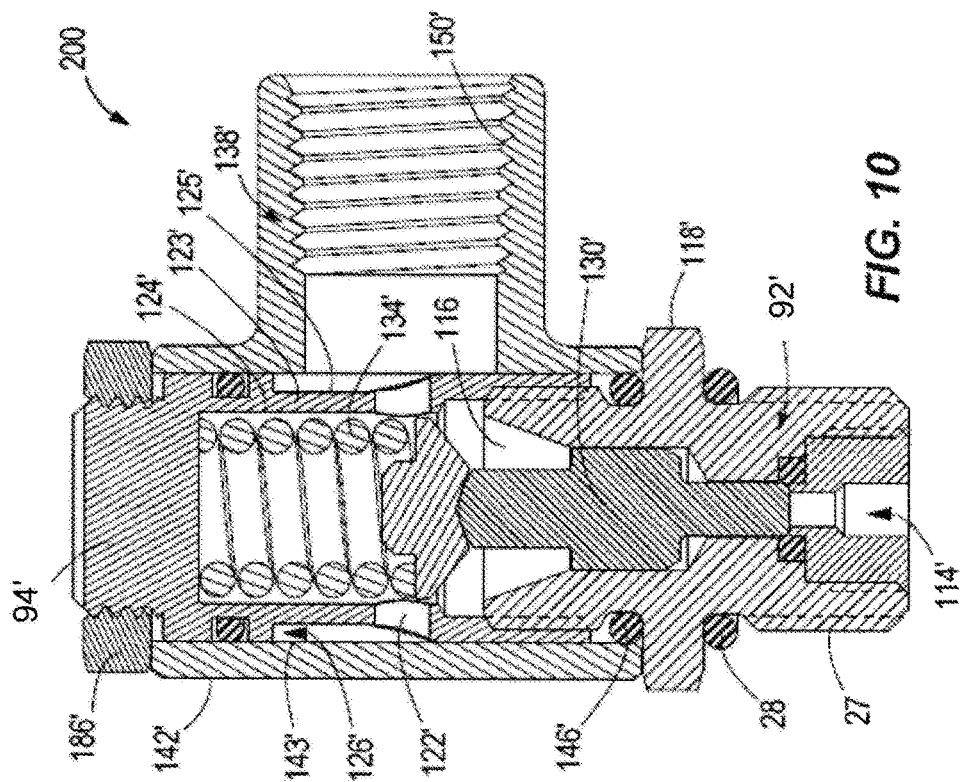
FIG. 10 is a section view of a relief valve according to another construction of the invention.

FIG. 10 shows a relief valve 200 that includes a body that is not monolithic and comprises a first body element 92' and a second body element 94'. The first body element 92' defines an inlet 114' and a shoulder 118'. The second body element 94' is threadingly coupled to the first body element 92' and defines exit holes 122', an annular body wall 123', and an annular space 126'. The exit holes 122 are disposed within the annular body wall 123'. A valve closure element in the form of a piston 130', a stabilizing element 133', and a spring 134' is arranged within the first body element 92' and the second body element 94'. The piston 130', stabilizing element 133', and spring 134' are arranged along an axial direction 100. The relief valve 200 is shown in a closed position. An outlet housing 138' is coupled to the body 110' and arranged to rotate three-hundred-sixty degrees (360°) thereabout. The outlet housing 138' defines an annular outlet housing wall 142' that is sealed relative to the body 110' by o-rings 146' and includes an outlet 150' (for example, an outlet aperture). In certain embodiments, the outlet 150' or outlet aperture may be threaded. The outlet housing 138' is retained to the body 110' by the shoulder 118' and a lock nut 186'.

The function of the relief valve 200 is the same as that described in reference to FIG. 1. A flow path from the inlet 114' to the outlet 150' or outlet aperture may be such that a fluid traveling along the flow path comes into contact substantially only with the first body element 92', the second body element 94', the piston, 130', and the outlet housing 138'. In certain embodiments, a fluid traveling along the flow path comes into contact with the stabilizing element 133' and the spring 134'.

Figure 11:
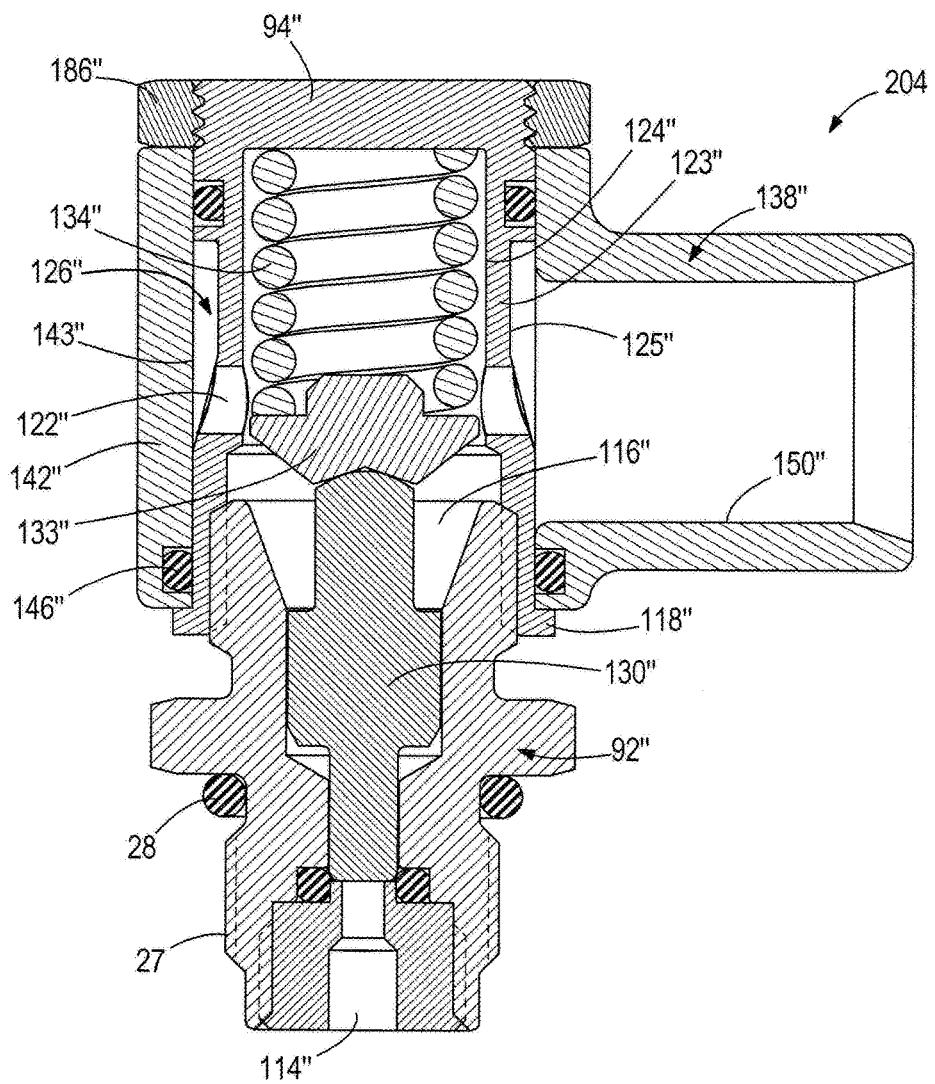
FIG. 11 is a section view of a relief valve according to another construction of the invention.

FIG. 11 shows a relief valve 204 that includes a body that is not monolithic and comprises a first body element 92" and a second body element 94". The first body element 92" defines an inlet 114". The second body element 94" is threadingly coupled to the first body element 92" and defines a shoulder 118", exit holes 122", an annular body wall 123", and an annular space 126". The exit holes 122" are disposed within the annular body wall 123". A valve closure element in the form of a piston 130", a stabilizing element 133', and a spring 134" are arranged within the first body element 92" and the second body element 94'. The piston 130", stabilizing element 133", and spring 134" are arranged along an axial direction 100. The relief valve 204 is shown in a closed position. An outlet housing 138" is coupled to the upper body 94" and arranged to rotate three-hundred-sixty degrees (360°) thereabout. The outlet housing 138" defines an annular outlet housing wall 142" that is sealed relative to the body 110" by o-rings 146" and includes an outlet 150" (for example, an outlet aperture). In certain embodiments, the outlet 150" or outlet aperture may be threaded. The outlet housing 138" is retained to the body 110" by the shoulder 118" and a lock nut 186".

The function of the relief valve 200 is the same as that described in reference to FIG. 1. A flow path from the inlet 114" to the outlet 150" or outlet aperture may be such that a fluid traveling along the flow path comes into contact substantially only with the first body element 92", the second body element 94", the piston, 130", and the outlet housing 138". In certain embodiments, a fluid traveling along the flow path comes into contact with the stabilizing element 133" and the spring 134".

Figure 12:
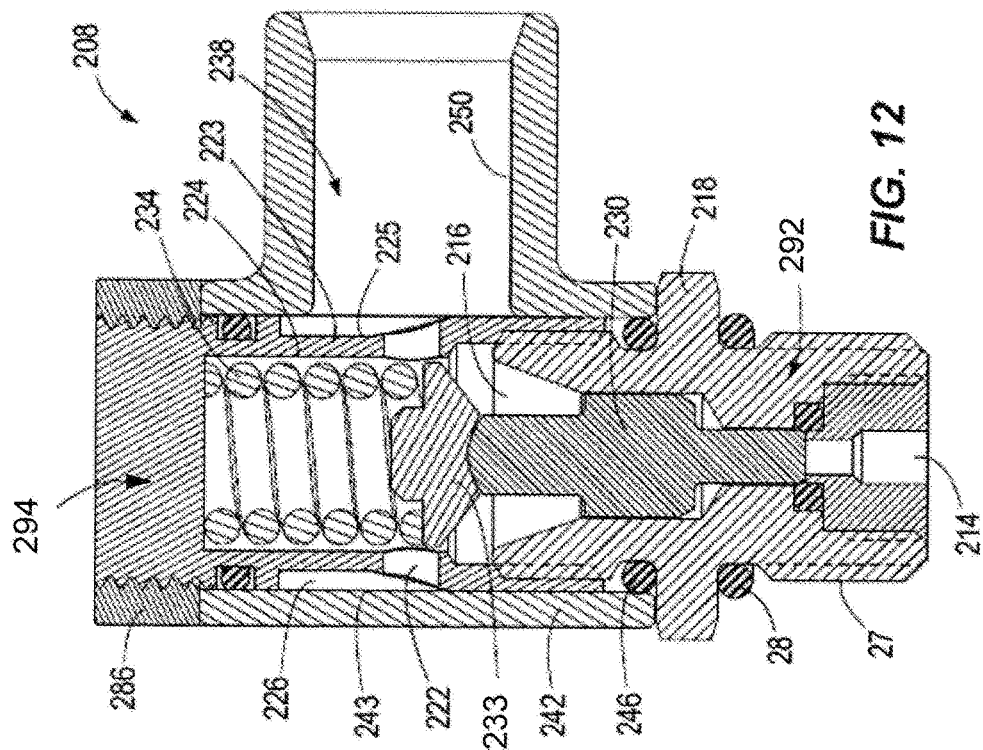
FIG. 12 is a section view of a relief valve according to another construction of the invention.

FIG. 12 shows a relief valve 208 that includes a body that is not monolithic and comprises a first body element 292 and a second body element 294, The first body element 292 defines an inlet 214 and a shoulder 218. The second body element 294 is threadingly coupled to the first body element 292 and defines exit holes 222, an annular body wall 223, and an annular space 226. The exit holes 222 are disposed within the annular body wall 223. A valve closure element in the form of a piston 230, a stabilizing element 233, and a spring 234 are arranged within the first body element 292 and the second body element 294. The piston 230, stabilizing element 233, and spring 234 are arranged along an axial direction 100. The relief valve 208 is shown in a closed position. An outlet housing 238 is coupled to the body and arranged to rotate three-hundred-sixty degrees (360°) thereabout. The outlet housing 238 defines an annular outlet housing wall 242 that is sealed relative to the body 210 by o-rings 246 and includes an outlet 250 (for example, an outlet aperture). In certain embodiments, the outlet 250 or outlet aperture may be threaded. The outlet housing 238 is retained to the body 210 by the shoulder 218 and a lock nut 286.

The function of the relief valve 200 is the same as that described in reference to FIG. 1. A flow path from the inlet 214 to the outlet 250 or outlet aperture may be such that a fluid traveling along the flow path comes into contact substantially only with the first body element 92', the second body element 294, the piston, 230, and the outlet housing 238, In certain embodiments, a fluid traveling along the flow path comes into contact with the stabilizing element 233 and the spring 234.

Figure 13:
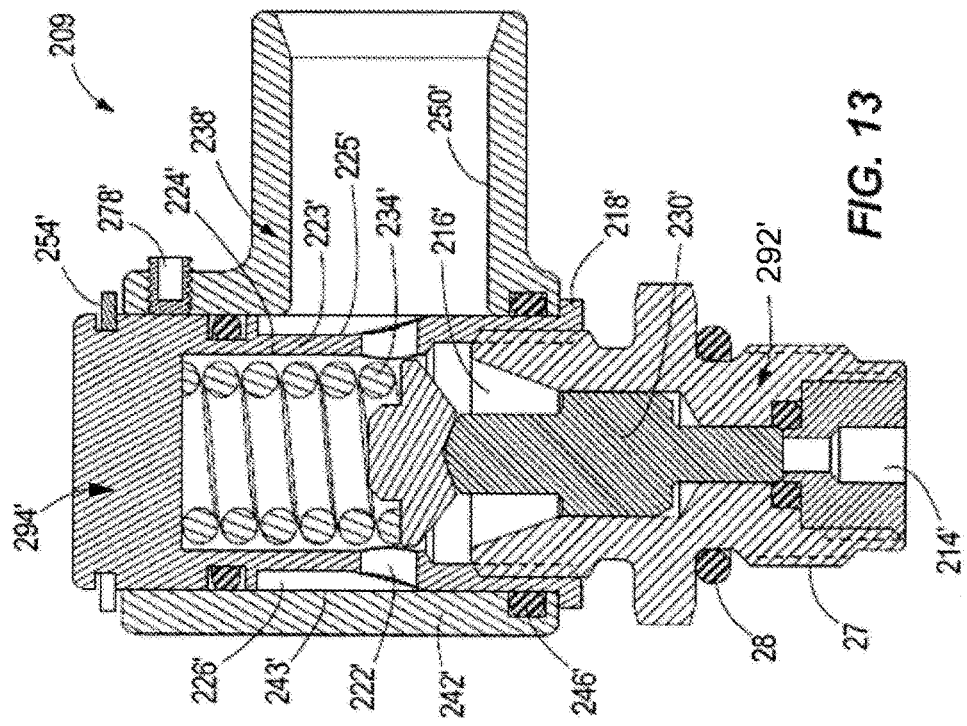
FIG. 13 is a section view of a relief valve according to another construction of the invention.

FIG. 13 shows a relief valve 209 that includes a body that is not monolithic and comprises a first body element 292' and a second body element 294'. The first body element 292' defines an inlet 214'. The second body element 294' is threadingly coupled to the first body element 292' and defines a shoulder 218', exit holes 222', an annular body wall 223', and an annular space 226'. The exit holes 222' are disposed within the annular body wall 223'. A valve closure element in the form of a piston 230', a stabilizing element 233, and spring 234' is arranged within the first body element 292' and the second body element 294'. The piston 230', stabilizing element 233', and spring 234' are arranged along an axial direction 100. The relief valve 209 is shown in a closed position. An outlet housing 238' is coupled to the upper body 294' and arranged to rotate three-hundred-sixty degrees (360°) thereabout. The outlet housing 238' defines an annular outlet housing wall 242' that is sealed relative to the body 210' by o-rings 246' and includes an outlet 250' (for example, an outlet aperture). In certain embodiments, the outlet 250' or outlet aperture may be threaded. The outlet housing 238' is retained to the body 210' by the shoulder 218' and a retainer clip 254'. A lock screw 278' is arranged through the annular outlet housing wall 242' to maintain the outlet housing 238' is a consistent position relative to the body 210', as desired.

The body 10, 10', 10", 10'" or first body element 92, 92', 92", 292 can include a coupling mechanism for coupling to an inlet stub that provides fluid pressure. In certain embodiments, referring to FIG. 9, but not limiting to that embodiment, the coupling mechanism can include one or more coupling mechanism threaded sections 27 for threadingly coupling the body 10 to an inlet stub. In certain embodiments, referring to FIG. 9, but not limiting to that embodiment, the coupling mechanism can include one or more coupling mechanism o-rings 28 for sealing the body 10 to an inlet stub. A person having ordinary skill in the art will recognize that there are alternative coupling mechanisms to those shown in the figures. In certain embodiments, the coupling mechanism requires a corresponding part on the inlet stub in order to establish a proper seal. In certain embodiments, the coupling mechanism provides a fluid-tight seal between the inlet stub and the body. The certain embodiments, the fluid-tight seal has a fail pressure of at least about the opening pressure.

The inlet connection of the illustrated relief valves is integral to the body. The outlet is part of a separate housing that slips over the body so that the outlet housing can rotate about the centerline of the body. The body contains all necessary components essential to a pressure relief valve and is fully functional without the outlet housing. The body has multiple discharge holes that are about the circumference of its outer diameter. Therefore, the discharge by the assembly without the outlet housing is multidirectional radially about the relief valve. This relief valve, arranged with no outlet housing, is fully functional and can be used as such in applications not requiring discharge in one direction. In embodiments shown in FIGS. 1, 2, and 5-13 the outlet housing may be removed or replaced without releasing pressure on the valve closure element.

The discharge holes in the body are aligned with an internal annular cavity designed into the outlet housing which allows for a smooth, uniform, and ample flow space to flow the discharge. The outlet housing may have only one outlet hole which is connected to the annular flow cavity in the interior of housing (or on the outside of the body), as desired.

The outlet housing pivots about the body while riding on two o-rings (alternately the smooth rotation can be achieved with two rows of ball bearings) which also provide a seal between the body and the housing in two places on either side of the flow cavity. When installing, the body's inlet is screwed into the piping installation snuggly. After valve inlet installation, the floating/pivoting housing can be rotated to its desired direction then held in position with a locking mechanism (e.g., a set screw or a lock nut).

This invention allows a decoupling of positions of inlet versus outlet when installed. An installer can rotate the valve relief exhaust in any direction around the centerline of the relief valve after installation without tampering with the inlet installation. In some installations, the seals may be changed for another type as is known in the art. For example, cryogenic applications may require a different sealing arrangement as o-rings are often not suitable.

Other constructions are possible in view of the following claims.

We claim:

1. A relief valve comprising:
    a body defining an inlet, an annular body wall, and a shoulder;
    a valve closure element disposed at least partially within the body and arranged to allow selective flow through the relief valve in response to a predetermined pressure, the valve closure element comprising
        a central pull rod;
        a piston surrounding a first end of the central pull rod; and
        a spring positioned between the piston and a spring adjustment mechanism, the spring surrounding at least a portion of the central pull rod;
    an outlet housing separate from and coupled to the body and rotatable with respect to the body, the outlet housing defining an outlet that is in selective communication with the inlet, and a substantially cylindrical inner annular outlet housing wall arranged to abut the annular body wall, an annular space defined between the inner annular outlet housing wall and the annular body wall, the outlet housing abutting the shoulder; and
    a lock nut engaging the body and the outlet housing, a portion of the annular body wall extending into and through a central channel extending through the lock nut, the outlet housing being maintained on the body by the shoulder and the lock nut,
    wherein at least two exit holes are formed radially through the annular body wall, each of the at least two exit holes each being defined by a radius smaller than an inner radius of the outlet and being disposed in fluid communication with the outlet.

2. The relief valve of claim 1, wherein the at least two exit holes are arranged down stream of the valve closure element.

3. The relief valve of claim 1, wherein the body defines the annular space, and the annular space and the at least two exit holes provide flow to the outlet.

4. The relief valve of claim 1, wherein the outlet housing defines the annular space, the at least two exit holes and the annular space provide flow to the outlet.

5. The relief valve of claim 1, wherein the body includes a first body element coupled to a second body element.

6. The relief valve of claim 5, wherein the first body element defines the inlet and the spring of the valve closure element is at least partially disposed within the second body element.

7. The relief valve of claim 1, wherein the valve closure element is fully functional in the absence of the outlet housing.

8. A relief valve comprising:
    a body that includes an annular body wall that defines an inlet, and a shoulder that extends radially outwardly from an adjacent portion of the annular body wall;
    a valve closure element disposed at least partially within the body and arranged to allow selective flow through the relief valve in response to a predetermined pressure;
    a rotatable outlet housing that is separate from and coupled to the body and that includes an inner annular outlet housing wall and an outlet that extends through the inner annular outlet housing wall, the rotatable outlet housing being received around the annular body wall with an inner annular outlet housing wall of the rotatable outlet housing surrounding a portion of the annular body wall, with the rotatable outlet housing seated upon and axially engaged with the shoulder, and with the rotatable outlet housing defining an outlet in selective fluid communication with the inlet; and
    a lock nut threadably coupled to, and axially adjustable relative to, the annular body wall, to selectively engage a first axial end of the outlet housing to urge a second, opposite axial end of the outlet housing into the shoulder,
    wherein at least two exit holes are formed radially through the annular body wall, each of the at least two exit holes each being defined by a radius smaller than an inner radius of the outlet and being disposed in fluid communication with the outlet.

9. The relief valve of claim 8, wherein a cylindrical section of the outlet includes a cylindrical, threaded passageway extending radially outwardly from the inner annular outlet housing wall.

10. The relief valve of claim 9, wherein a first annular groove is formed in the rotatable outlet housing, the first annular groove facing the body and being axially offset from the cylindrical section and positioned proximate the first axial end of the outlet housing.

11. The relief valve of claim 10, wherein a second annular groove is formed in the rotatable outlet housing, the second annular groove facing the body and being axially offset from the cylindrical section and positioned opposite the first annular groove, proximate the second axial end of the outlet housing.

12. The relief valve of claim 11, wherein an O-ring is received in each of the first annular groove and the second annular groove to produce a seal between the body and the outlet housing.

13. The relief valve of claim 8, wherein an annular space is defined between the body and the outlet housing, the annular space extending between the annular body wall and the inner annular outlet housing wall.

14. The relief valve of claim 13, wherein the annular space is defined by an axial height that is larger than a diameter of the outlet.

15. The relief valve of claim 13, wherein the valve closure element inhibits fluid communication between the inlet and the outlet housing when the valve closure element is in a closed position, the valve closure element being biased toward the closed position and comprising:
   a piston having a first end configured to close the inlet;
   a stabilizer having a first end in contact with a second end of the piston, the second end opposite the first end; and
   a spring having a first end in contact with the stabilizer and a second end in contact with an adjustment mechanism.

16. The relief valve of claim 8, wherein the annular body wall includes at least two sets of threads on opposite axial ends of the body.

17. A relief valve for directionally relieving pressure, the relief valve comprising:
   a body having an inlet, and a body cavity that is at least partially defined by an annular body wall that extends about a longitudinal axis, the annular body wall including coupling sections formed on opposing axial ends thereof and having a shoulder that extends radially outwardly beyond, and is positioned axially between, the coupling sections;
   a valve closure element disposed at least partially within the body, the valve closure element inhibiting fluid communication between the inlet and the body cavity when the valve closure element is in a closed position, the valve closure element being biased toward the closed position;
   an outlet housing separate from and rotatable relative to the body, the outlet housing including an inner annular outlet housing wall and a cylindrical outlet passage that extends radially outwardly from the inner annular outlet housing wall, and the outlet housing being received around the annular body wall and being seated upon and axially engaged with the shoulder; and
   a lock nut threadably received on one of the coupling sections of the annular body wall and being axially adjustable along the longitudinal axis to axially engage the outlet housing opposite the shoulder, to selectively secure the outlet housing between the shoulder and the lock nut to restrict relative rotation between the outlet housing and the body,
   wherein at least two exit holes are formed radially through the annular body wall, each of the at least two exit holes each being defined by a radius smaller than an inner radius of the outlet and being disposed in fluid communication with the outlet.

18. The relief valve of claim 17, wherein each of the coupling sections formed on opposing axial ends of the annular body wall is defined by external threads.

19. The relief valve of claim 17, wherein the cylindrical outlet passage is positioned axially between two annular grooves formed within the outlet housing, each of the two annular grooves receiving an O-ring to provide a seal between the outlet housing and the body.

* * * * *